US012699196B2

(12) United States Patent
Xu et al.

(10) Patent No.: US 12,699,196 B2
(45) Date of Patent: Aug. 4, 2026

(54) FRAMEWORK FOR INTEGRATION OF GEO-INFORMATION EXTRACTION, GEO-REASONING AND GEOLOGIST-RESPONSIVE INQUIRIES

(71) Applicant: ExxonMobil Technology and Engineering Company, Spring, TX (US)

(72) Inventors: Peng Xu, Annadale, NJ (US); Huseyin Denli, Basking Ridge, NJ (US); Stijn De Waele, Flemington, NJ (US); Mary K. Johns, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 531 days.

(21) Appl. No.: 17/922,739

(22) PCT Filed: Apr. 19, 2021

(86) PCT No.: PCT/US2021/070420
§ 371 (c)(1),
(2) Date: Nov. 1, 2022

(87) PCT Pub. No.: WO2021/226614
PCT Pub. Date: Nov. 11, 2021

(65) Prior Publication Data
US 2023/0176242 A1     Jun. 8, 2023

Related U.S. Application Data

(60) Provisional application No. 63/198,438, filed on Oct. 19, 2020, provisional application No. 62/704,357,
(Continued)

(51) Int. Cl.
*G01V 1/30* (2006.01)
*G01V 3/38* (2006.01)
(Continued)

(52) U.S. Cl.
CPC ................ *G01V 1/302* (2013.01); *G01V 3/38* (2013.01); *G01V 20/00* (2024.01); *G06N 3/044* (2023.01);
(Continued)

(58) Field of Classification Search
CPC . G01V 1/302; G01V 1/30; G01V 3/38; G01V 20/00; G01V 2210/64; G06N 3/044; G06N 3/045; G06N 3/08
See application file for complete search history.

(56) References Cited

U.S. PATENT DOCUMENTS

| | | | |
|---|---|---|---|
| 4,713,775 A | 12/1987 | Scott et al. | |
| 2014/0278115 A1* | 9/2014 | Bas ........................ | G01V 20/00 702/14 |

(Continued)

OTHER PUBLICATIONS

Donahue, Jeffrey, et al. "Long-term recurrent convolutional networks for visual recognition and description." Proceedings of the IEEE conference on computer vision and pattern recognition. 2015.
(Continued)

*Primary Examiner* — Lal Ce Mang
(74) *Attorney, Agent, or Firm* — Lempia Summerfield Katz LLC

(57) ABSTRACT

A computer-implemented method for analyzing geophysical data is disclosed. Interpretation of geophysical data, such as seismic data, can be performed in multiple stages, such as at an information extraction stage and an information analysis stage. Typically, the information analysis stage is performed by geologists or interpreters, which may be laborious and inconsistent. The disclosed method includes using an information extractor that extracts information indicative of geo-features in a subsurface and an inference engine that analyzes the information indicative of geo-features in a subsurface to generate an output, with the information extractor and the inference engine being integrated and
(Continued)

acting in combination. For example, the information extractor may generate summaries of the geo-features or answers to questions. In this way, the information extractor and the inference engine in combination may act synergistically, such as in the context of reasoning, natural language processing, and the outputs generated.

23 Claims, 10 Drawing Sheets

Related U.S. Application Data filed on May 6, 2020, provisional application No. 62/704,358, filed on May 6, 2020.

(51) Int. Cl.

| | | |
|---|---|---|
| *G01V 20/00* | (2024.01) | |
| *G06N 3/044* | (2023.01) | |
| *G06N 3/045* | (2023.01) | |
| *G06N 3/08* | (2023.01) | |

(52) U.S. Cl.
CPC .............. *G06N 3/045* (2023.01); *G06N 3/08* (2013.01); *G01V 2210/64* (2013.01)

(56) References Cited

U.S. PATENT DOCUMENTS

| | | | | |
|---|---|---|---|---|
| 2015/0015412 A1* | 1/2015 | Abbassian | .............. | E21B 41/00 |
| | | | | 340/854.4 |
| 2016/0053604 A1* | 2/2016 | Abbassian | .............. | E21B 44/00 |
| | | | | 702/6 |
| 2017/0254911 A1* | 9/2017 | Can | ......................... | G01V 1/345 |
| 2018/0245441 A1* | 8/2018 | Mohaghegh | ............ | E21B 43/26 |
| 2018/0288154 A1* | 10/2018 | Ghazaleh | .............. | G06F 3/0659 |
| 2018/0298746 A1* | 10/2018 | Short | ...................... | E21B 41/00 |
| 2018/0336507 A1* | 11/2018 | Torrado | ................ | G06N 20/00 |
| 2019/0114302 A1* | 4/2019 | Bequet | ................... | G06N 3/084 |
| 2019/0244122 A1 | 8/2019 | Li et al. | | |
| 2021/0012774 A1* | 1/2021 | Sureka | ................... | G10L 15/22 |
| 2022/0099855 A1* | 3/2022 | Li | ......................... | G01V 1/345 |
| 2022/0351403 A1* | 11/2022 | Jiang | ..................... | G06N 3/047 |

OTHER PUBLICATIONS

International Search Report for PCT application No. PCT/US2021/070420 mailed Nov. 11, 2021.
Wrriten Opinion for PCT application PCT/US2021/070420 mailed Nov. 11, 2021.

* cited by examiner

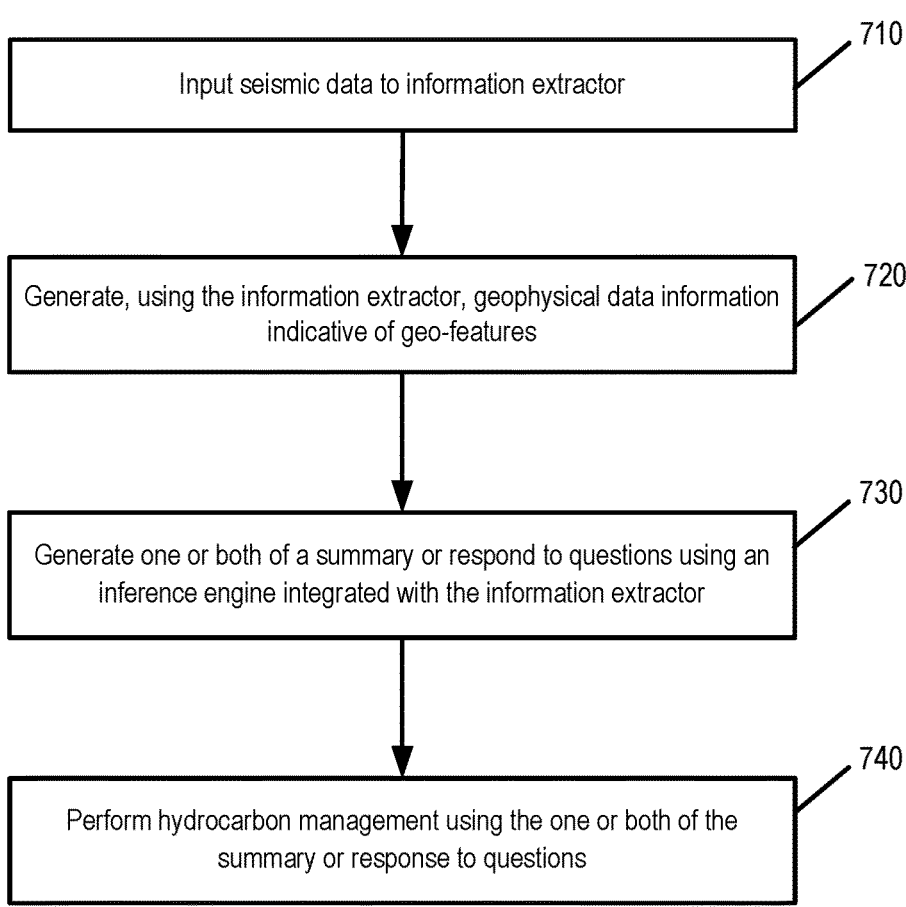

700

Input seismic data to information extractor     710

Generate, using the information extractor, geophysical data information indicative of geo-features     720

Generate one or both of a summary or respond to questions using an inference engine integrated with the information extractor     730

Perform hydrocarbon management using the one or both of the summary or response to questions     740

FIG. 7

FRAMEWORK FOR INTEGRATION OF GEO-INFORMATION EXTRACTION, GEO-REASONING AND GEOLOGIST-RESPONSIVE INQUIRIES

CROSS-REFERENCE TO RELATED APPLICATIONS

This application claims the benefit of U.S. Provisional Application No. 62/704,357 filed on May 6, 2020, U.S. Provisional Application No. 62/704,358 filed on May 6, 2020, and U.S. Provisional Application No. 63/198,438 filed on Oct. 19, 2020, the disclosures of which are incorporated by reference herein in their entirety.

FIELD OF THE INVENTION

The present application relates generally to the field of hydrocarbon exploration, development and production. Specifically, the disclosure relates to a methodology and framework for geo-information extraction, geo-reasoning, and geologist-responsive inquiries (such as question-answering capability).

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

One goal of geophysical prospecting is to accurately detect, locate, identify, model, and/or quantify subsurface structures and likelihood of hydrocarbon occurrence. For example, seismic data may be gathered and processed to generate subsurface models. Seismic prospecting is facilitated by acquiring raw seismic data during performance of a seismic survey. The seismic data is processed in an effort to create an accurate mapping (e.g., an image and/or images of maps, such as 2-D or 3-D images presented on a display) of the subsurface region. The processed data is then examined (e.g., analysis of images from the mapping) with a goal of identifying geological structures that may contain hydrocarbons.

Geophysical data (e.g., acquired seismic data, acquired electromagnetic data, reservoir surveillance data, etc.) may be analyzed to develop subsurface models. For example, seismic interpretation may be used to infer geology (e.g., subsurface structures), fluids and reservoirs and hydrocarbon system elements from seismic data (e.g., seismic images or geophysical and petrophysical models). For example, structural interpretation generally involves the interpretation of subsurface horizons (e.g. boundaries between formations), geobodies (e.g. salt anomaly), and/or faults from subsurface images (such as, e.g., pre-stack or partial-stack seismic images or attributes derived from seismic images). The structural interpretation is currently considered to be one of the laborious tasks that typically takes months of interpreters' time. As such, structural interpretation is one of the key bottlenecks along with other interpretation tasks and geological reasoning in the interpretation workflow.

Information may be extracted from geophysical data in one of several ways. In one way, a domain expert (such as a geoscientist or an interpreter) may extract information from available subsurface data and subjectively synthesize the extracted information based on the expert's knowledge. In another way, computer-based techniques may provide structural interpretation assistance. For example, an information extractor may extract from the geophysical data information indicative of geo-features, such as faults or facies. The extracted geo-features may then be analyzed, such as using one or more rules, in order to interpret the extracted geo-features.

Background references may include U.S. Pat. No. 9,952, 340 B2; U.S. Patent Application Publication Nos. 2014/0118350 A1 and 2019/0064378 A1; PCT Publication No. WO 2014/1502626 A1; and non-patent literature references Anderson et al. (2018) "Bottom-up and top-down attention for image captioning and visual question answering", 2018 IEEE/CVF Conference on Computer Vision and Pattern Recognition, pp. 6077-6086, doi: 10.1109/CVPR.2018.00636; Andrychowicz et al. (2016) "*Learning to learn by gradient descent by gradient descent*". $30^{th}$ Conference on Neural Information Processing Systems (NIPS 2016), pp. 3988-3996, doi: 10.5555/3157382.3157543; Battaglia et al. (2018) "*Relational inductive biases, deep learning, and graph networks*", pp. 1-40 arXiv preprint arXiv:1806.01261: Devlin et al. (2019) "BERT: Pre-training of deep bidirectional transformers for language understanding", pp. 1-16, arXiv:1810.04805: Donahue et al. (2015) "Long-term Recurrent Convolutional Networks for Visual Recognition and Description" 2015 IEEE Conference on Computer Vision and Pattern Recognition (CVPR), pp. 2625-2634, doi: 10.1109/CVPR.2015.7298878: Finn et al. (2017) "*Model-Agnostic Meta-Learning for Fast Adaptation of Deep Networks*", Proceedings of the 34th International Conference on Machine Learning, Sydney, Australia, PMLR 70, pp. 1-10; Goodfellow et al. (2016) "*Deep learning*", MIT press, pp. i-vii, 369-372, and 555-586; He et al. (2018) "Mask R-CNN", pp. 1-12, arXiv: 1703.06870: Johnson et al. (2015) "Image retrieval using scene graphs", 2015 IEEE Conference on Computer Vison and Pattern Recognition (CVPR), pp. 3668-3678, doi: 10.1109/CVPR.2015.7298990: Karpathy et al. (2015). "Deep visual-semantic alignments for generating image descriptions", 2015 IEEE Conference on Computer Vision and Pattern Recognition (CVPR), pp. 3128-3137, doi: 10.1109/CVPR.2015.7298932: Li et al. (2019) "VisualBERT: A Simple and Performant Baseline for Vision and Language", pp. 1-14, arxiv.1908.03557; Daniel Milliner (2011) "*Modern hierarchical, agglomerative clustering algorithms*" arXiv preprint arXiv:1109.2378, pp. 1-29; Yosinski et al. (2014) "*How transferable are features in deep neural networks?*". Advances in Neural Information Processing Systems (NIPS), pp. 3320-3328; Zhang et al. (2018) "*Variational Reasoning for Question Answering with Knowledge Graph*", The Thirty-Section AAAI Conference on Artificial Intelligence (AAAI-18), pp. 6069-6076; and Zhou et al. (2019) "Graph Neural Networks: A Review of Methods and Applications", arXiv preprint arXiv: 1812.08434, pp. 1-22.

SUMMARY OF THE INVENTION

In one or some embodiments, a computer-implemented method for analyzing geophysical data is disclosed. The method includes; accessing the geophysical data; performing, using an information extractor analyzing the geophysical data, information extraction in order to generate information indicative of geo-features in a subsurface: and performing, using an inference engine analyzing the information indicative of the geo-features in the subsurface, information analysis in order to generate a response to at least one question regarding the subsurface, wherein the information extractor and the inference engine are integrated and act in combination in order to generate the response to at least one question regarding the subsurface.

BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

FIG. 7 illustrates a flow chart for operating the framework.

DETAILED DESCRIPTION OF THE INVENTION

Figure 1:
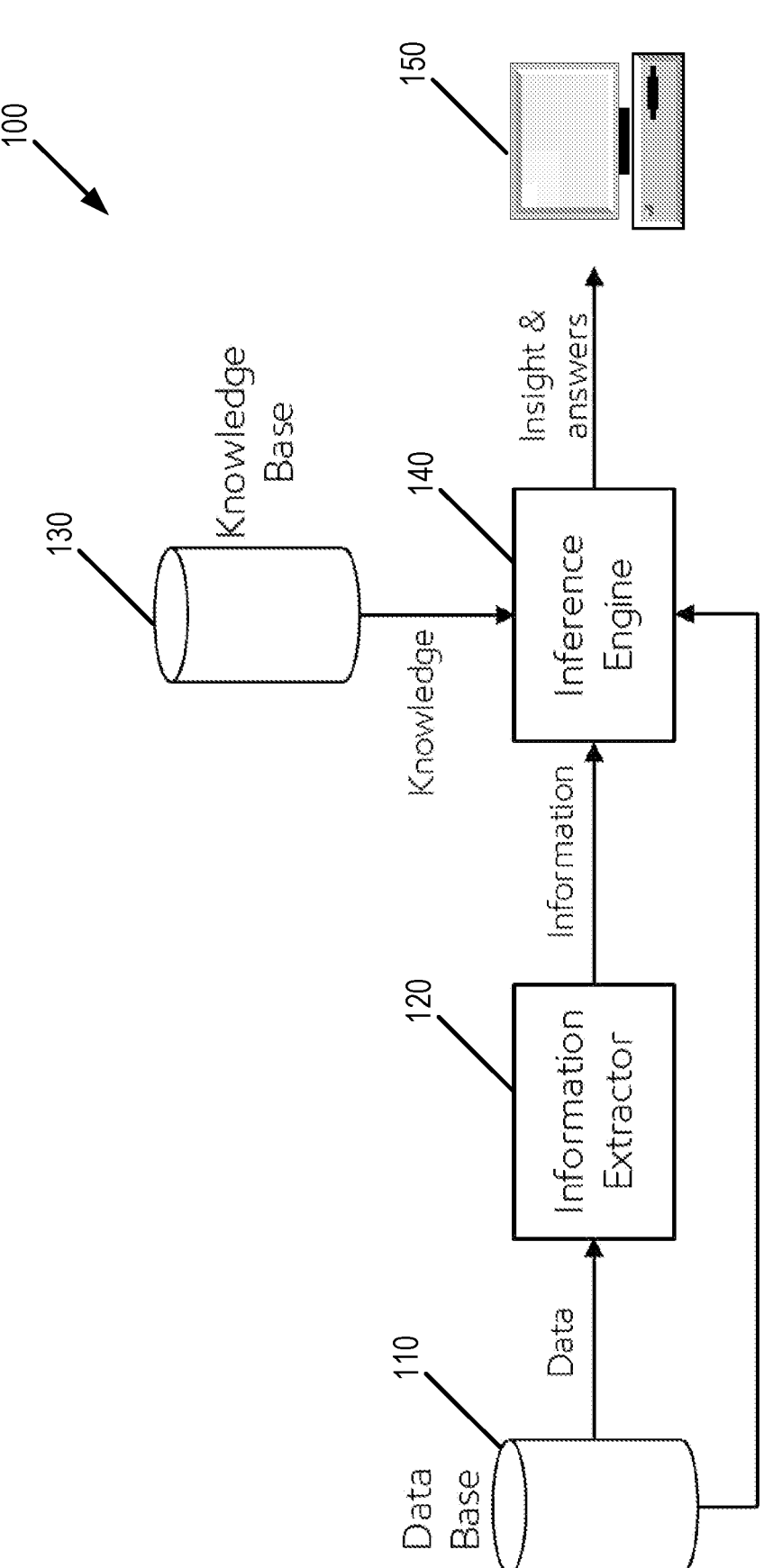
FIG. 1 illustrates an example block diagram of the framework.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation. The term "nominal" means as planned or designed in the absence of variables such as wind, waves, currents, or other unplanned phenomena. "Nominal" may be implied as commonly used in the fields of seismic prospecting and/or hydrocarbon management. It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an" and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation. The term "nominal" means as planned or designed in the absence of variables such as wind, waves, currents, or other unplanned phenomena. "Nominal" may be implied as commonly used in the fields of seismic prospecting and/or hydrocarbon management.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the overall operation. As another example, the two or more events may occur during time periods that overlap by about 40% to about 100% of either period.

The term "seismic data" as used herein broadly means any data received and/or recorded as part of the seismic surveying and interpretation process, including displacement, velocity and/or acceleration, pressure and/or rotation, wave reflection, and/or refraction data. "Seismic data" is also intended to include any data (e.g., seismic image, migration image, reverse-time migration image, pre-stack image, partially-stack image, full-stack image, post-stack image or seismic attribute image) or interpretation quantities, including geophysical properties such as one or more of: elastic properties (e.g., P and/or S wave velocity. P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying and interpretation process. Thus, this disclosure may at times refer to "seismic data and/or data derived therefrom." or equivalently simply to "seismic data." Both terms are intended to include both measured/recorded seismic data and such derived data, unless the context clearly indicates that only one or the other is intended. "Seismic data" may also include data derived from traditional seismic (e.g., acoustic) data sets in conjunction with other geophysical data, including, for example, gravity plus seismic; gravity plus electromagnetic plus seismic data, etc. For example, joint-inversion utilizes multiple geophysical data types.

The term "geophysical data" as used herein broadly includes seismic data, as well as other data obtained from non-seismic geophysical methods such as electrical resistivity. In this regard, examples of geophysical data include, but are not limited to, seismic data, gravity surveys, well logs, radar data, or temperature data.

The term geological features (interchangeably termed geo-features) as used herein broadly includes attributes associated with a subsurface, such as any one, any combination, or all of: subsurface geological structures (e.g., channels, geological bodies, geological layers, etc.); boundaries between subsurface geological structures (e.g., a boundary between geological layers, etc.); or structure details about a subsurface formation (e.g., subsurface horizons, subsurface faults, mineral deposits, bright spots, salt welds, distributions or proportions of geological features (e.g., lithotype proportions, facies relationships, distribution of petrophysical properties within a defined depositional facies), etc.). In this regard, geological features may include one or more subsurface features, such as subsurface fluid features, that may be hydrocarbon indicators (e.g., Direct Hydrocarbon Indicator (DHI)). Examples of geological features are disclosed in US Patent Application Publication No. 2010/0186950 A1, incorporated by reference herein in its entirety.

The terms "velocity model," "density model," "physical property model." or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geologic model (particularly a model represented in image form) may be represented in volume elements (voxels), in a similar way that a photograph (or 2-D geologic model) is represented by picture elements (pixels). Such numerical representations may be shape-based or functional forms in addition to, or in lieu of, cell-based numerical representations.

As used herein, "hydrocarbon management" or "managing hydrocarbons" includes any one, any combination, or all of the following: hydrocarbon extraction; hydrocarbon production, (e.g., drilling a well and prospecting for, and/or producing, hydrocarbons using the well; and/or, causing a well to be drilled. e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

The term "label" generally refers to identifications and/or assessments of correct or true outputs provided for a given set of inputs. Labels may be of any of a variety of formats, including text labels, data tags (e.g., binary value tags), pixel attribute adjustments (e.g., color highlighting), n-tuple label (e.g., concatenation and/or array of two or more labels), etc.

The term "geological reasoning" refers to a variety of tasks and processes related to identifying and/or localizing hydrocarbon system elements (e.g., trap, reservoir, seal, migration pathways, water-hydrocarbon contact surfaces, source rock etc.), inferring relationships among hydrocarbon system elements, and/or quantifying hydrocarbon accumulations, or probabilities thereof, in subsurface regions. Such tasks may include question answering, visual question answering, decision making, assigning ranking, assessing probability, and other reasoning tasks that ultimately facilitate hydrocarbon management.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed in the background, interpretation of geophysical data, such as seismic data, may be performed in multiple stages. For example, a first stage may comprise information extraction in which information is extracted from the seismic data (e.g., an information extractor extracts information indicative of geo-features in the subsurface). A second stage may comprise information analysis in which the information extracted is analyzed (e.g., an inference engine analyzes the information to generate summaries/answer questions meaningful to a geologist). This second stage currently carried out by a group of subject matter experts (SMEs) such as geologists or interpreters, faces three key challenges. Firstly, information may be sub-optimally integrated due to the overwhelming amount of observations and knowledge required for interpretation. Secondly, the reasoning is biased based on SMEs' knowledge and experience. Finally, it is a laborious process that may take an inordinate amount of time, such as on the order of months.

Further, reasoning at the various stages is important in understanding subsurface by identifying relationships among geological features. Reasoning involves the use of knowledge to analyze input data and information. Typically, knowledge is stored in the form of natural language, and visual graphs. In this regard, there are challenges to use this type of knowledge for reasoning. First, extracting knowledge from text is often difficult since natural language can be ambiguous and there are different ways to describe the same knowledge. Second, use of the knowledge to process data and information may also be difficult. Traditional natural language processing systems may be difficult to build and maintain for large-scale real world applications.

Thus, in one or some embodiments, the system includes an information extractor configured to extract information from seismic data and an inference engine configured to analyze the extracted information in order to generate summaries and/or answer questions meaningful to a geologist. As discussed in more detail below, the information extractor and the inference engine in combination may act synergistically, such as in the context of reasoning, natural language processing, and the outputs generated.

In one or some embodiments, the information extractor comprises a single neural network (NN) based machine learning model. For example, the single NN may generate information indicative of geo-features in the subsurface (e.g., a probability of volume highlighting geo-features, such as faults or facies) from the seismic data. Alternatively, the information extractor may comprise multiple NNs. For example, a first NN (configured to generate the information indicative of geo-features in a subsurface) may be combined with a second NN (or other tools) to convert the information indicative of geo-features in a subsurface to a more explicit representation of geo-bodies. In particular, the second NN may convert the probability volume generated by the first NN into a more explicit representation of geo-bodies. The NN(s) may comprise any one, any combination, or all of: a convolution neural network (CNN); such as a U-Net; a recurrent neural network (RNN): transformer-based networks or similar neural network structures. In addition, the NN(s) in the information extractor may be paired with one or both of a module configured to receive input from a geologist or commercial software. Further, the information extractor, whether a single NN or multiple NNs, may comprise a single module or multiple modules.

The information extractor may generate the information indicative of geo-features in the subsurface in one of several forms. In one form, the information extractor comprises visual pattern recognition module(s) to convert visual input data, such as seismic images, into geological information, such as faults and salt domes. In one or some embodiments, the visual pattern recognition module(s) may be realized by a convolution neural network, a U-Net, or similar neural network structures. Alternatively, or in addition, the information extractor is configured to generate a natural language output. As one example, the information extractor comprises a module to develop natural language descriptions of geo-bodies or geo-features of interest. In this way, the information extractor may comprise module(s), which may use one or both of rules or neural networks, to convert properties of a geo-body and/or a geo-feature to natural language. Examples of an information extractor are disclosed in U.S. Provisional Application No. 62/704,358 filed on May 6, 2020 entitled "STRUCTURED REPRESENTATIONS OF SUBSURFACE FEATURES FOR HYDROCARBON SYSTEM AND GEOLOGICAL REASONING", incorporated by reference herein in its entirety.

As discussed above, the inference engine is configured to analyze the extracted information generated by the information extractor in order to generate an output that may be useful to geologist. The output generated may take one or more forms. As one example, the output may comprise a summary that may generally assist a geologist, such as any one, any combination, or all of locations of seal, trap, migration path, or key geological features of interest to a geologist.

Alternatively, or in addition, the inference engine may answer questions input by a geologist. The questions may comprise pre-determined question (e.g., a question selected by the geologist from a set of predetermined questions) and/or may comprise a natural language question. With regard to natural language questions, the inference engine may comprise an interface through which the geologist inputs the question and by which the question is then translated into natural language. The inference engine may then answer the natural language question. Further, the answer to the questions may take one of several forms, including a natural language response and/or a visual output (e.g., a highlighted section in a seismic image). In this regard, in one or some embodiments, the inference engine is configured to generate at least two types of output, including summaries and answers to questions (e.g., answers to predetermined questions and/or iterative questions). Examples of an inference engine (including question-and-answer functionality) are disclosed in U.S. Provisional Application No. 62/704,357 filed on May 6, 2020 entitled "GEOLOGICAL REASONING WITH GRAPH NETWORKS FOR HYDROCARBON IDENTIFICATION", incorporated by reference herein in its entirety.

As discussed above, the information extractor and the inference engine may be integrated and act in combination. Integration is contemplated in several ways. In one way, integration may be one or both of the type of analysis performed or the output generated. For example, with regard to visual pattern integration, the information extractor may include a visual pattern recognition module to convert visual input data, such as seismic images, into geological information, such as faults and salt domes. Such visual pattern recognition performed by the visual pattern recognition module may then be used by the inference engine, such as by highlighting a portion of the seismic image responsive to a question.

As another example, with regard to natural language integration, natural language capabilities may be integrated into both of the information extractor and inference engine synergistically. In particular, segmenting the natural language processing between the information extractor and the inference engine may improve the ability to train the separate pieces. For example, the amount of training datasets in the field of hydrocarbon prospecting is a fraction of the training datasets generally available outside of the field of hydrocarbon prospecting. Further, in contrast to analyzing an image (performed by the inference engine), identifying geobodies (performed by the information extractor) may have less available training data and may require more skill. In this regard, the separateness of the information extractor (in generating a natural language description of an image) and the inference engine (in generating a natural language model to analyze the image) may leverage the available training datasets in order to maximize the ability to train the separate pieces of the information extractor and the inference engine.

Referring to the figures, FIG. 1 illustrates an example block diagram 100 of the framework, including database 110, information extractor 120, knowledge base 130, inference engine 140, and computer interface 150. The data in the database 110 may include one or more types of seismic data that may be processed in various ways, such as log data, basin data, or the like. The information extractor 120 is configured to receive the seismic data from the database 110 and to convert the seismic data into useful information for a geologist. Various types of conversion are contemplated. For example, a deep neural network may serve as the information extractor 120 and convert a seismic data cube into a probability volume highlighting geo-features such as faults and facies, as discussed further below. Further, various stages or levels of conversion performed by the information extractor 120 are contemplated. As one example, the information extractor is configured to generate the probability volume highlighting geo-features. As another example, the information extractor 120 is configured to perform multiple analytical stages, such as a probability stage (e.g., in which a probability volume is generated) and a subsequent stage (e.g., in which the probability volume is converted into a more explicit representation of the geo-bodies such as graph-based representation of the geo-bodies). In this regard, the information extractor 120 may comprise one or more NNs, such as a neural network assigned to each analytical stage of the information extractor 120.

The knowledge base 130 depicted in FIG. 1 is configured to store knowledge necessary for the reasoning tasks. Various manifestations of knowledge may be stored in the knowledge base 130 including any one, any combination, or all of: articles written in natural language; IF-THEN rules; or ontologies of various levels of complexity. The inference engine 140 has the capability to use the knowledge in the knowledge base 130 to infer from the aforementioned extracted information. In turn, the inference engine 140 may output useful insight to geologists. Examples of useful insight include locations of seal, trap, migration path, and key geological features that a geologist may need to pay more attention to. The inference engine 140 may further answer questions input by geologists. In one or some embodiments, the questions may be input as natural language to increase productivity.

Various questions are contemplated. For example, the question may be input via computer interface 150 and may ask the probability of a certain location being a fault. In response, the inference engine 140 may answer the question, thereby saving the geologist's time from tracing back to all the data processing steps to identify certain data and information. The inference engine is further capable of answering high-level questions that resemble human intelligence such as any one, any combination, or all of the following visual questions: "Are fault A and fault B intersecting each other?"; "Does fault C intersect this channel and the source rock?"; "Is this a closed anticline?"; "Which fluid—HC or water—is likely in this sand body?"; "What is the likely range of porosity for this rock?"; "What is the probable lithology of this body (e.g., sandstone, carbonate, shale)?"; "Does this channel erode another sand body?"; or "Was this fault active after the channel was deposited?"; "Was the salt mobile at the time of this sand body formation?".

Figure 2A:
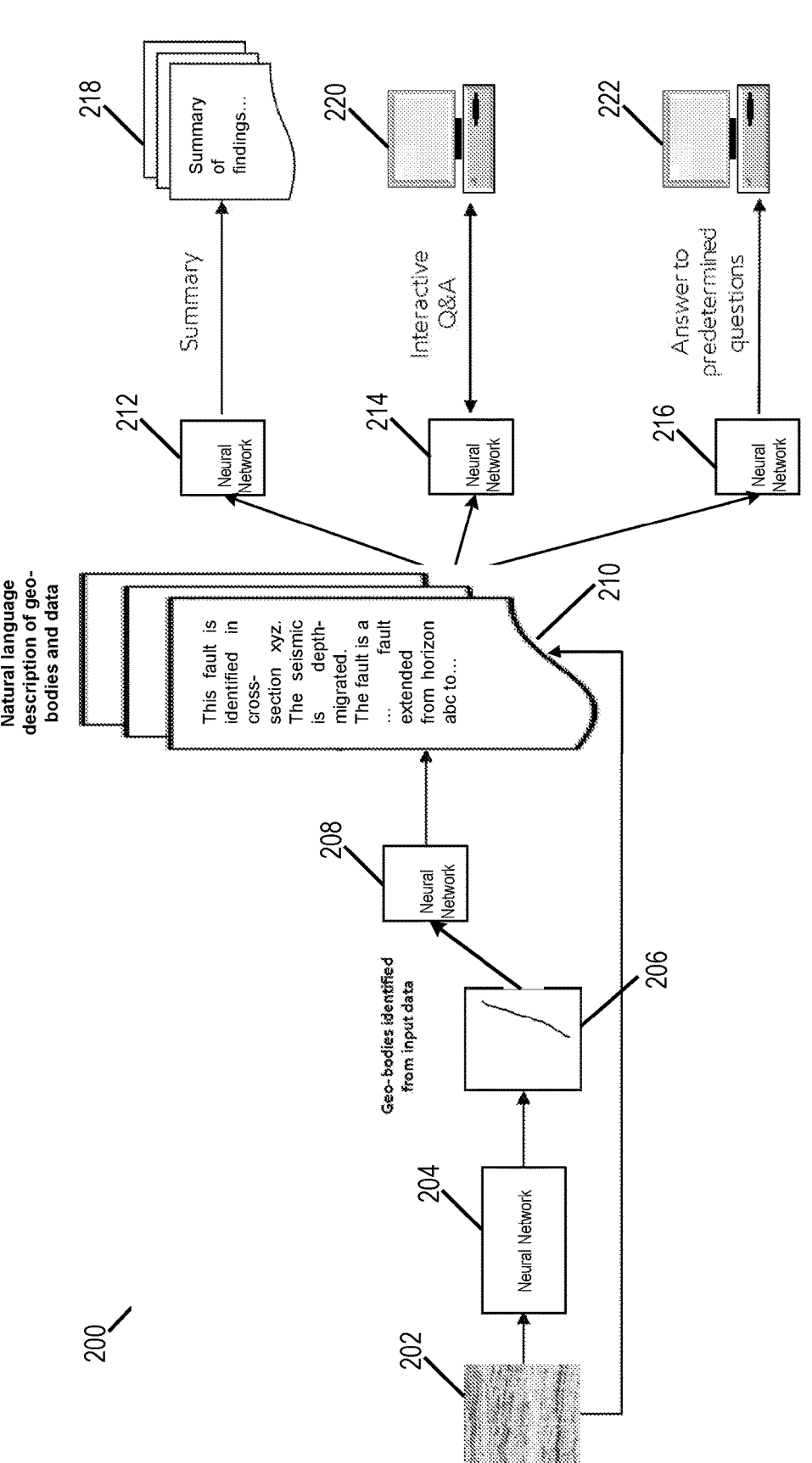
FIG. 2A illustrates another example block diagram of the framework with a question-answering system.

FIG. 2A illustrates another example block diagram 200 of the framework with a question-answering system. As shown, NN 204, such as a U-Net, serves as the information extractor to convert the input seismic data 202 into geo-bodies 206. FIG. 2A further illustrates a second NN 208 that writes a natural language description of the geo-bodies 210. In this regard, the second NN 208 may comprise a natural language processing module, such as an RNN or one or more transformers, that performs the natural language processing tasks.

Various natural language descriptions are contemplated, such as: "This fault is identified in cross-section xyz. It is a normal fault dipping about 60 degrees to the east."; "This feature has an 80% chance to be a channel. It is a deep water type of deposit. Given the processing information of the seismic, cross-section of the channel is about 100 meters wide and 50 meters thick."; or "This is a horizon in the depth ranging from 6050 feet to 7260 feet. Its depth is two times the depth of the water bottom, so is likely a multiple and not a geologic feature.". To generate the natural language description, NNs may be used. Alternatively, rules or other means may be used to generate the natural language description.

As shown in FIG. 2A, the natural language description of the geo-bodies and data 210 may be input to one or more neural networks 212, 214, 216 for further processing. For example, one NN 212, such as an RNN, or transformers, may be trained to generate a summary of the findings 218 to highlight key features of a seismic data set. Alternatively, rule-based approaches, or other means, can be used to generate such summaries. Another NN 214, such as an RNN, may be trained to work interactively with a geologist to answer his/her questions input via a computer interface 220. Alternatively, or in addition, still another NN, such as an RNN or transformers, may be trained to answer predetermined questions input via computer interface 222.

As discussed above, the inference engine may be preconfigured to answer predetermined questions. Various predetermined questions are contemplated, such as any one, any combination, or all of: "Which seismic events/bodies are likely sand?"; "Which seismic events/bodies are likely shale?"; "Does this sandbody become thinner updip?"; "Are there sealing rocks updip, laterally, and below a sandbody?": "Is this reservoir touching any other reservoir?": "Where is the crest of a possible trap?"; "What is the elevation of the crest?"; "Where is the trap's spillpoint?"; or "What is the elevation of the spillpoint?".

FIG. 2A illustrates two separate computer interfaces 220, 222 in which to input interactive questions/answers and predetermined questions, respectively. Alternatively, a single computer interface may be used to input and receive output with regard to the interactive questions/answers and predetermined questions. Further, FIG. 2A illustrates separate NNs 212, 214, 216 for each of the functions of generating the summary, interactive Q&A, and answers to predetermined questions. Alternatively, fewer NNs may be used. As one example, a single NN may be used for both of the functions of interactive Q&A and answers to predetermined questions.

FIG. 2A may use a variety of different types of NNs. As one example, NN 204 and NN 208 may comprise a U-Net and an RNN, respectively, to extract text from images. Alternatively, other types of neural networks may replace one or both of the U-Net or the RNN. Still alternatively, a combined neural network model may be used to extract text directly from images. Further, FIG. 2A depicts NNs both for the information extractor and the inference engine. Alternatively, a single complex NN may perform both functions of information extraction and knowledge inference. As merely one example, information extraction and natural language processing may be performed by a single neural network (e.g., a transformer-based neural network such as Visual-BERT). In addition, a geologist or commercial software may perform information extraction function in combination with the information extraction performed by the NNs depicted in FIG. 2A.

Figure 2B:
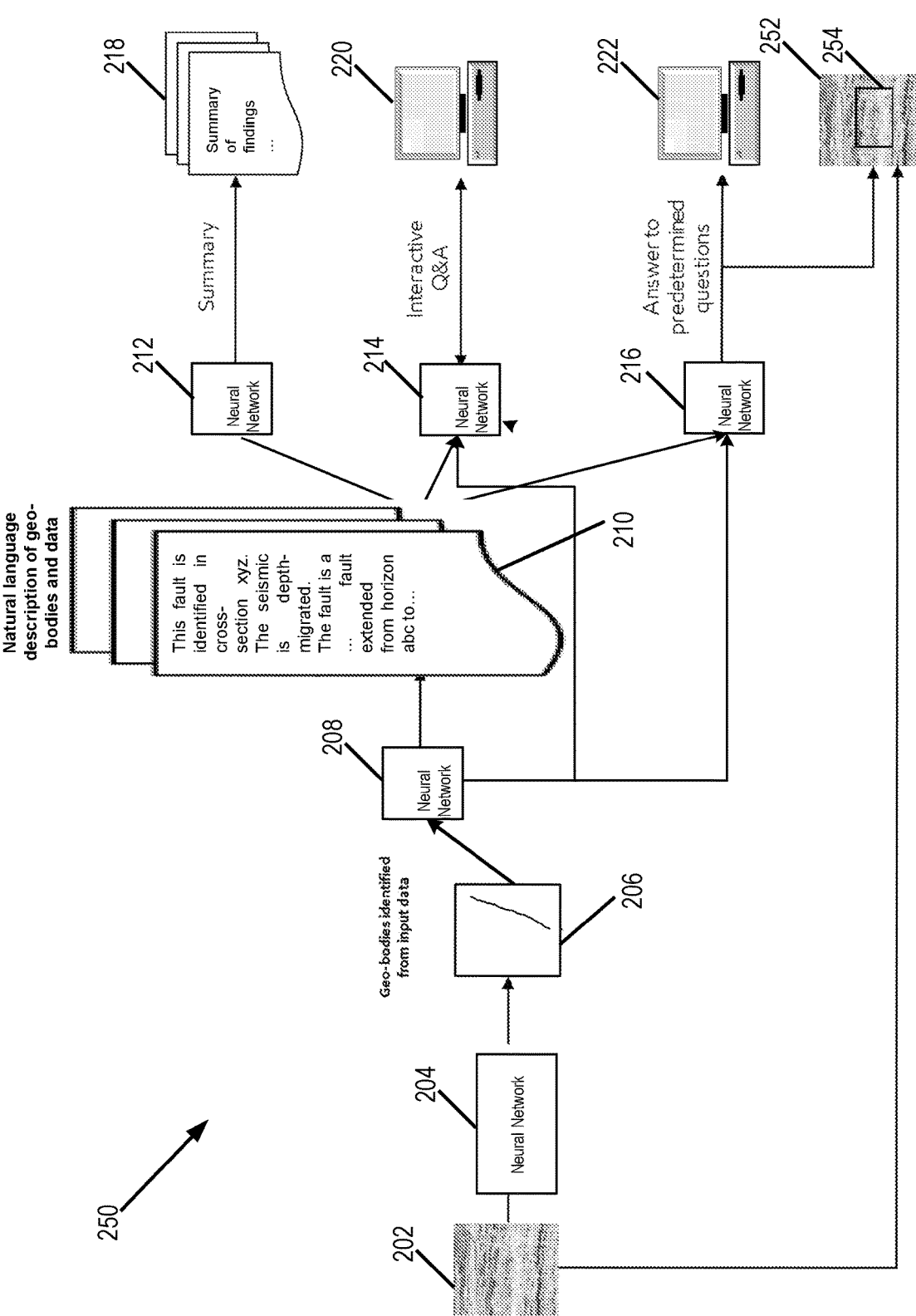
FIG. 2B illustrates yet another example block diagram of the framework with a question-answering system.

FIG. 2B illustrates yet another example block diagram 250 of the framework with a question-answering system. In particular, various aspect of integration of the information extractor and the inference engine are illustrated in FIG. 2B. In addition to integration of the output of the information extractor as input to the inference engine (e.g., shown as the output from 210 to one, some, or each of NNs 212, 214, 216), neural networks in the information extractor may be integrated with one, some, or all of the neural networks of the inference engine. This is illustrated, for example, by the connections between NN 208 and NNs 214, 216. As discussed above, the NN for the information extractor may include as a focus natural language processing and may be configured to generate natural language outputs. The natural language processing and/or the natural language outputs from the information extractor NN may be integrated with one or more NNs of the inference engine, such as shown by the connections between NN 208 and NNs 214, 216. As such, the natural language processing of both of the information extractor and the inference engine may be synergistic. As merely one example, answers generated by the inference engine may be supported by the visual evidences. For instance, if an answer to a question asking whether the two faults are intersecting is yes, a visual showing their intersecting image may be generated as evidence in support of the answer.

Further, the integration between the information extractor and the inference engine may be visual. As shown in FIG. 2B, the information extractor may include a visual output 252, which may include a bounding box 254 or some other boundary indicator. The visual output 252, generated by a visual pattern recognition module, may comprise one or more images that highlights any one, any combination, or all of: faults; salt formation; facies; stratigraphic segments; reservoir; seal: trap; or other hydrocarbon indicators. Other ways in which to highlight the visual output 252 are contemplated, including generating an image indicative of a probabilistic volume, pseudo colored images, or the like. Thus, the seismic image may be manipulated, such as by superimposing colors onto an image, modifying colors associated with an image, segmenting the image (e.g., removing a section of the image for highlighting of the section), or the like. In this way, the input to the information extractor may likewise be manipulated by the inference engine in order to generate an output. Thus, in addition to providing a textual answer, the system may use an attention mechanism to provide a numerical output or the like (e.g. the bounding box 254 or object identifier) to indicate part of the image is relevant to the answer. In practice, the bounding box 254 may comprise an overlay on the seismic image in order to highlight the one or more geo-bodies that are identified by the information extractor and relevant to the answer provided (e.g., illustrative of the natural language description).

Figure 3A:
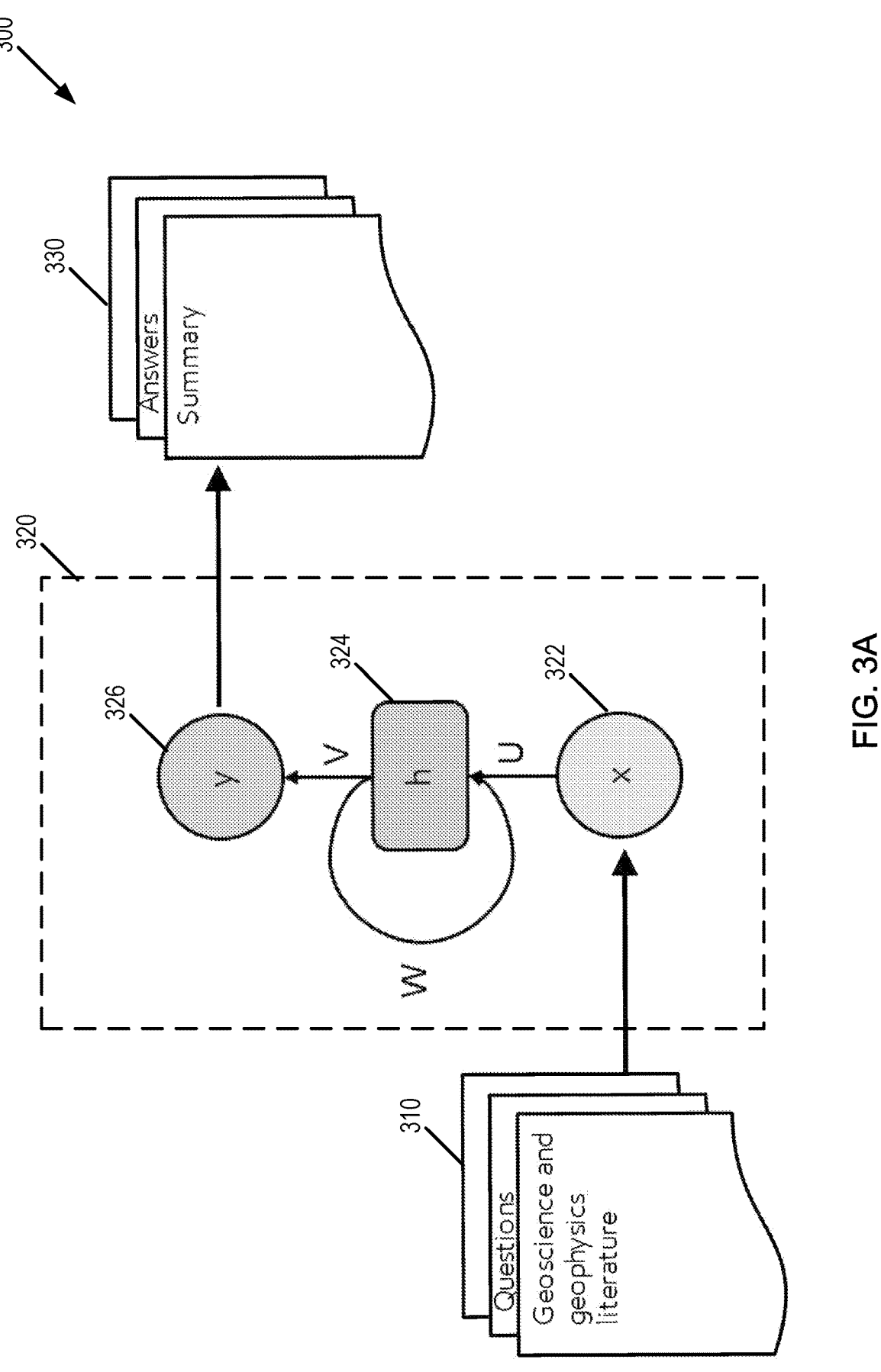
FIG. 3A illustrates a first block diagram of trained RNNs generating one or more outputs, such as a description of an identified geo-body, a summary of a dataset, or answers to predetermined and/or interactive questions.

FIG. 3A illustrates a first block diagram 300 of trained RNNs generating one or more outputs, such as a description of an identified geo-body, a summary of a dataset, or answers to predetermined and/or interactive questions 330. As shown, various knowledge, such as questions, geoscience/geophysics literature, or the like 310 are input to RNN 320. As shown, RNN 320 comprises input vector x 322 via U into hidden vector h 324, and via V to output vector y 326, with feedback W. In this way, RNN 320 comprises an input layer, an output layer, and one or more hidden layers. The RNN 320 has the mechanism to let the hidden layer provide feedback to itself (via W). In other words, an RNN may be considered as a series of neural networks connected by their hidden layers. This allows the RNN to process sequence data, such as text data. Combined with a convolutional neural network for image recognition, a RNN trained with natural language may be used to generate a description of an input image. An alternative to RNNs could be transformer technology such as BERT (Bidirectional Encoder Representation from Transformers) or GPT (Generative Pre-Trained Transformer). Both RNNs and transformers may also be used for language processing and question-answer applications. Thus, in one or some embodiments, RNNs and transformers may be used to process natural languages for geological reasoning purposes. It is noted that the present description of RNNs and transformers are for illustration purpose only. Different variations of RNN and transformer architectures are contemplated. Further, various other methodologies, such as ontologies discussed further below, are contemplated.

Figure 3B:
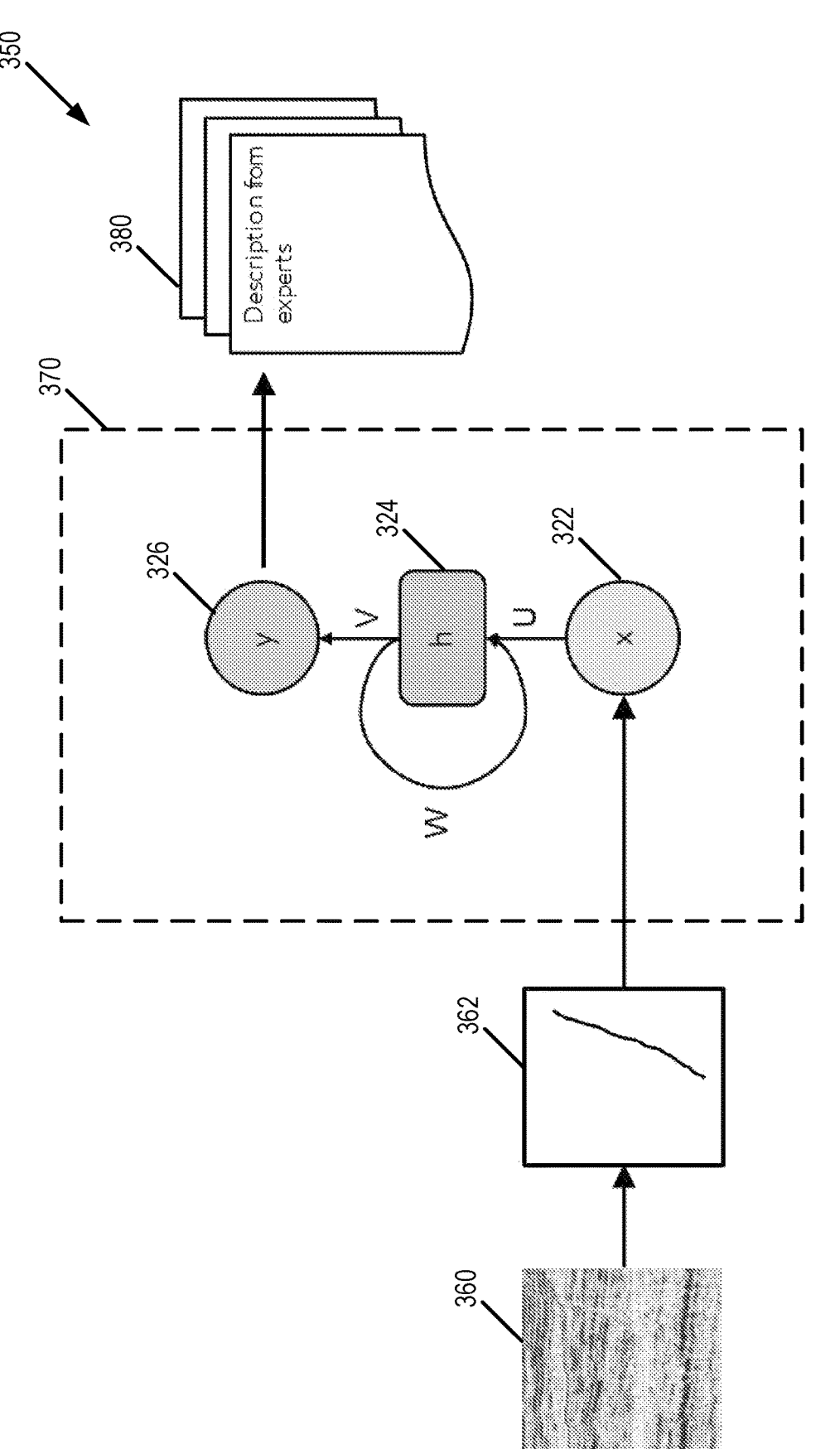
FIG. 3B illustrates a second block diagram of trained RNNs generating a description of a geo-body.

FIG. 3B illustrates a second block diagram 350 of trained RNNs generating a description of a geo-body. In one or some embodiments, the input to the RNN may be one or more properties of geo-bodies. By way of example, a fault is a type of a geo-body and has the following properties: dip; strike: relative offset of layers across the fault; category (e.g., normal and reverse); depth range; throw (slip displacement along the fault), and relative timing. These properties may be generated by a pattern recognition deep neural network (e.g., U-Net) or may be manually generated. In one or some embodiments, the output comprises a natural language description of the corresponding geo-body. The RNN 370 in FIG. 3B may be pre-trained using the process illustrated in FIG. 3A. For example, the pre-training may comprise using the learned parameters from the model in the RNN 320 in FIG. 3A as initial values for parameters of the model for the RNN 370 in FIG. 3B. Alternatively, the models in FIGS. 3A-B may share part of their model parameters that are trained simultaneously. Depending on the implementation and the design of the neural network (or other models), an image 360 and in turn the geo-bodies identified 362 from the image 360 may directly serve as input of the neural network. It is noted that FIGS. 3A-B use RNNs, variations of RNNs, such as long short-term memory (LSTM, ELMO), transformers such as BERT, GPT or other methodologies with hidden states, such as Hidden Markov, Models (HMM), may be used.

Figure 4:
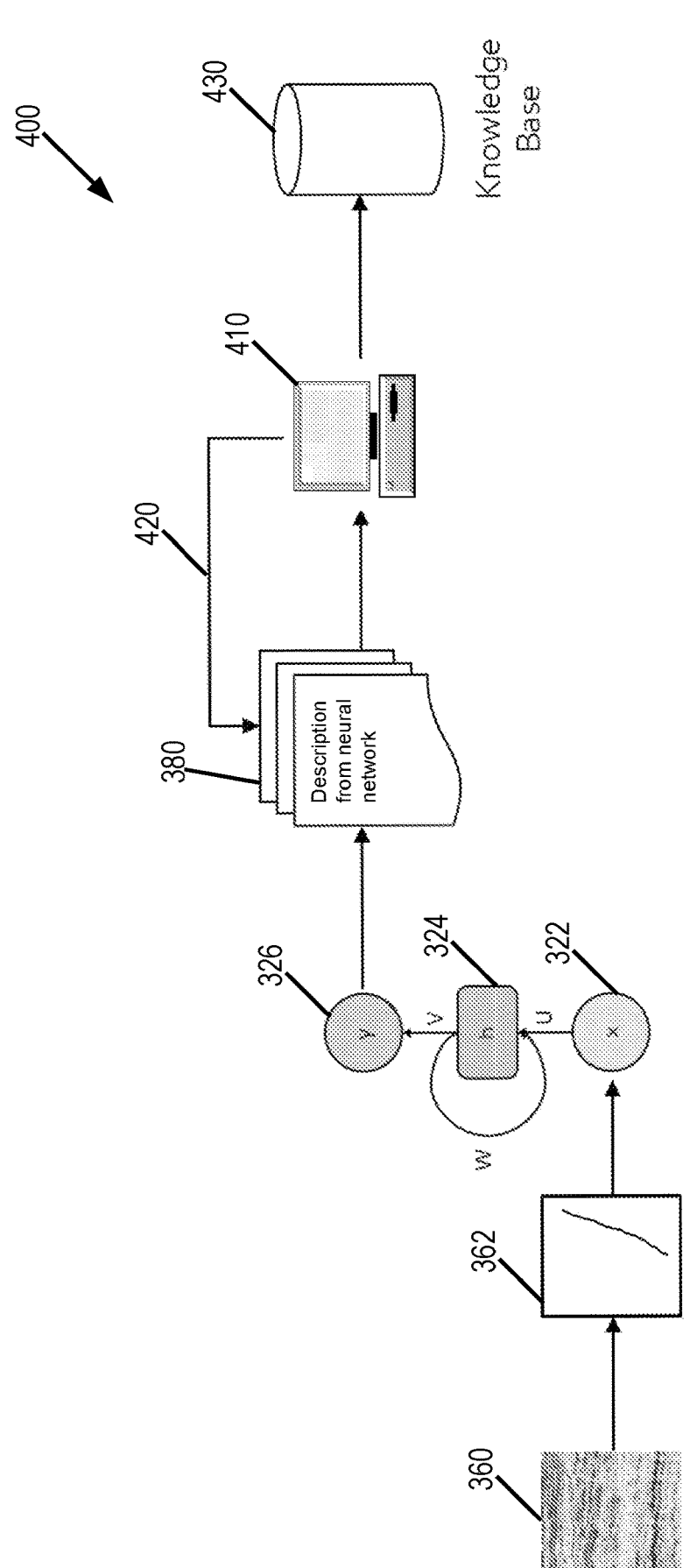
FIG. 4 illustrates a block diagram for fine-tuning the inference engine.

FIG. 4 illustrates a block diagram 400 for fine-tuning the inference engine via a continual learning process. In this process, the output 380 generated by an RNN (e.g., summary, answers) or transformer may be validated by users via computer interface 410, who may revise the RNN or transformer output and/or rewrite the output via feedback 420. The feedback 420 may be in any one, any combination, or all of: text input; voice input; or other format. In this way, the feedback 420 may be used to retrain the inference engine. The validated output may then be stored in a knowledge base 430 along with the corresponding RNN or transformer input. The data in this knowledge base 430 may thus be used to retrain the RNN or transformer to achieve better performance. The neural network, such as the RNN depicted in FIG. 4, may also highlight a subset of data for geologists to focus on. For example, the subset may comprise data where the neural network has high uncertainties. In addition, a simulator, not shown in the figure, may be used to generate training data. Separate from the neural network depicted in FIG. 4, another neural network may be used to select data for training. In this way, the two neural networks may "playing games" to "challenge" each other to improve the continual learning. Thus, knowledge may be derived from one or more sources, including the feedback illustrated in FIG. 4 and/or observations from the seismic data illustrated in FIGS. 2A-B, both of which may be incorporated into the knowledge base 130, 430 illustrated in FIGS. 1 and 4. Further, while FIG. 4 illustrates a single RNN, it is contemplated that multiple RNNs may be used (e.g., each RNN used for a respective type of expertise) to improve the overall effectiveness of the system.

Big picture: put together the knowledge base observations depending on the seismic data (illustrated in FIG. 2) and the human knowledge. And the framework can connect all of this at a higher level.

Figure 5:
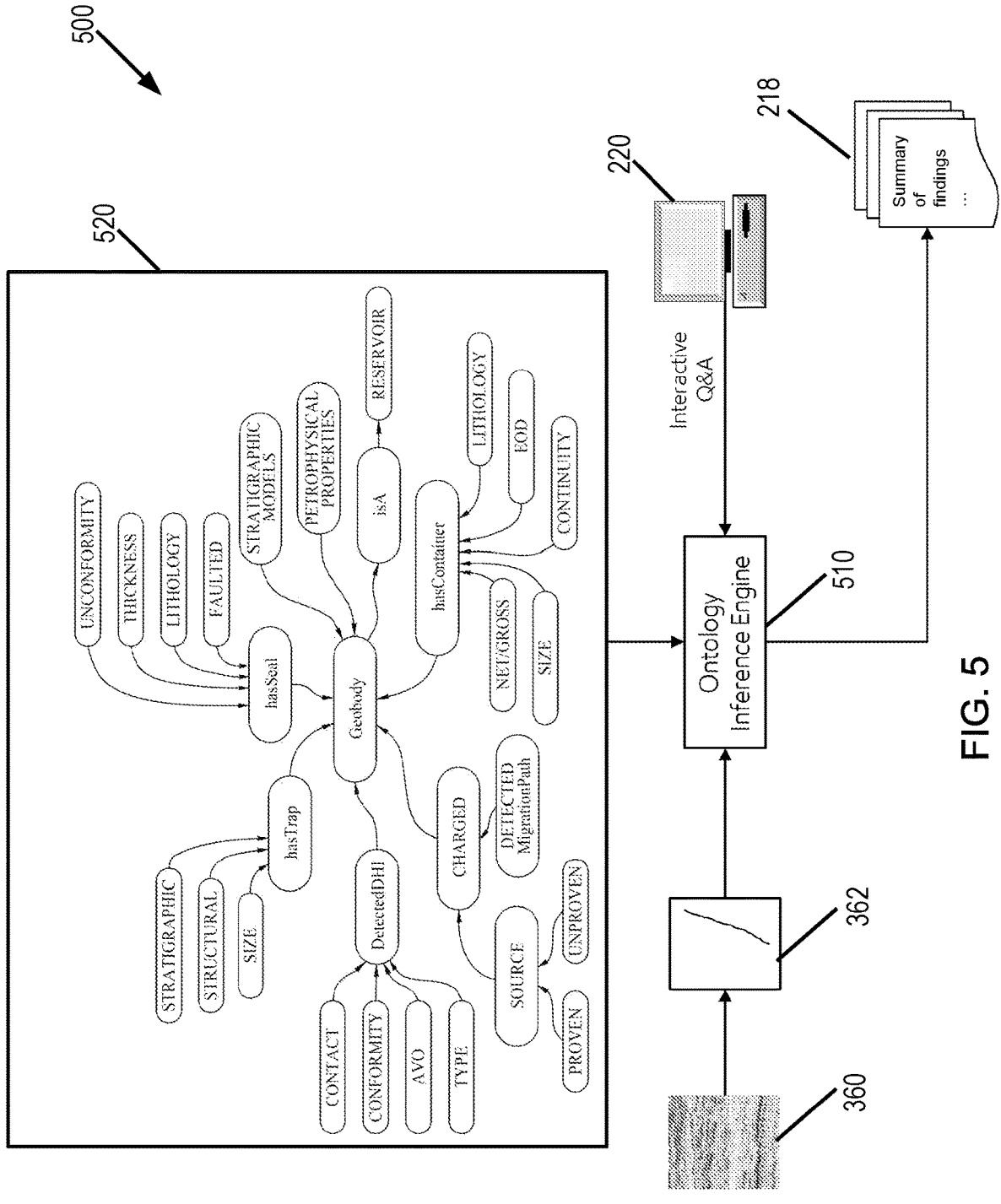
FIG. 5 illustrates another block diagram of the framework with an ontology inference engine.

FIG. 5 illustrates another block diagram 500 of the framework with an ontology inference engine 510. The ontology inference engine 510 comprises an alternative way in which to organize knowledge. The input of the inference engine 510 may comprise one or more properties of identified geo-bodies 362. The ontologies 520 used as the base of the inference for the ontology inference engine 510 may be hand-crafted and/or extracted by computer algorithms (see FIG. 6). In one or some embodiments, the ontologies may have generic geological knowledge. Alternatively, the ontologies may be specialized for certain basins, geologies, etc. Further, a forward chaining method may be used by the ontology inference engine 510 to derive facts that satisfy the logics as well as the input data. The derived outcome may be used in one or more contexts. As one example, the derived outcome may be written into a summary 218. Alternatively, or in addition, a backward chaining method may be used by the inference engine to answer users' questions input via computer interface.

Figure 6:
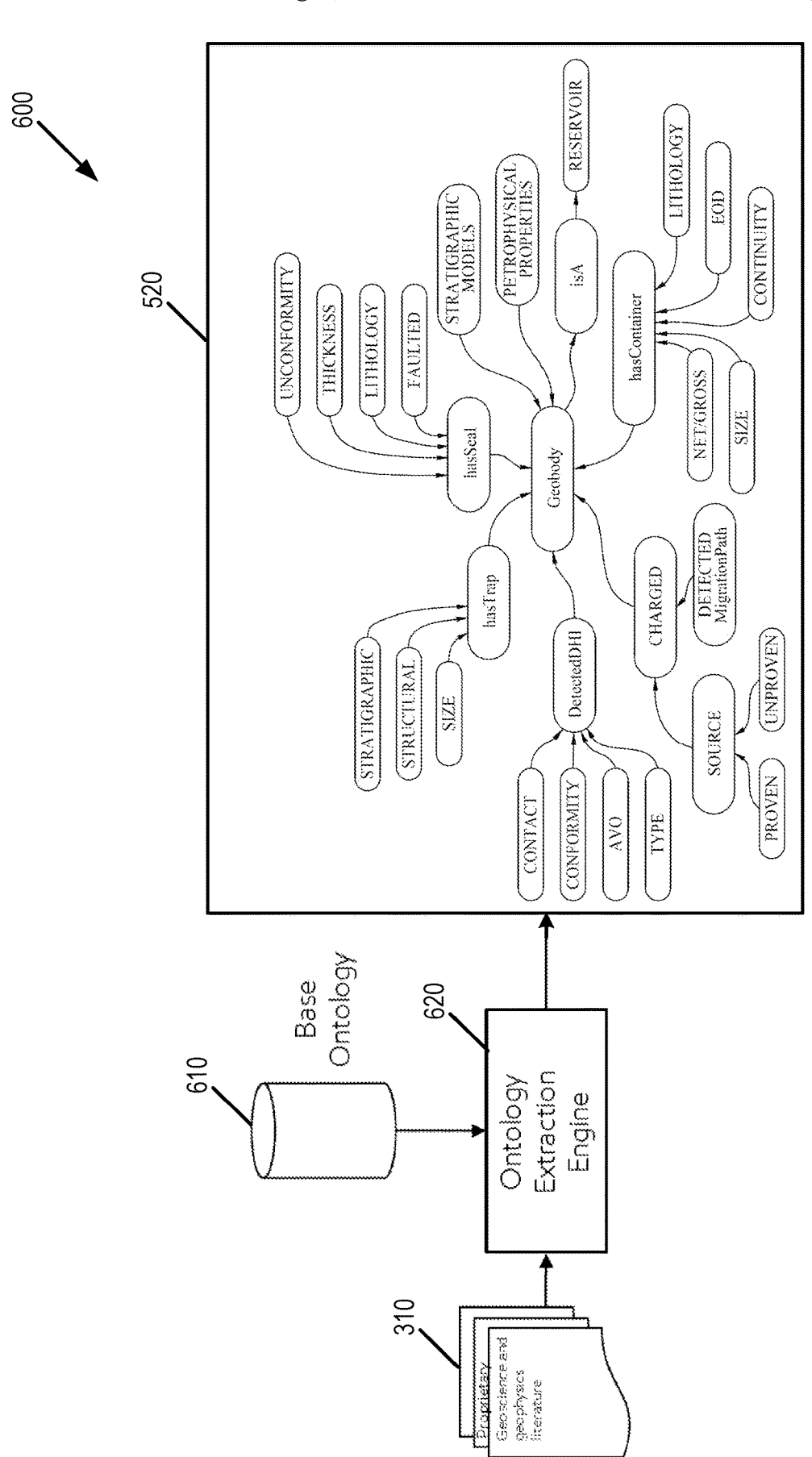
FIG. 6 illustrates a block diagram of ontology extraction from natural language.

FIG. 6 illustrates a block diagram 600 of ontology extraction from natural language. The input may comprise a body of text containing geological knowledge and a base ontology, which may be hand crafted. The ontology extraction engine 620 may use natural language processing algorithms to analyze input text, identify key concepts of interest (e.g., fault, channel), the properties of these concepts, and the relationship among these concepts. The ontology extraction engine 620 may then map these concepts to the base ontology 610, resulting in an enriched ontology that may be used in the reasoning process described in FIG. 5. Alternatively, the ontologies described herein may be replaced with rules by those skilled in the art of knowledge inference.

FIG. 7 illustrates a flow chart 700 for operating the framework. At 710, seismic data is input to the information extractor. At 720, the information extractor generates geophysical data information indicative (observation) of geo-features. As discussed above, geophysical data information indicative of geo-features may take one of several forms. At 730, an inference engine, which is integrated with the information extractor, then generates one or both of a summary or a response to questions (whether predetermined or through natural language processing) based on the geophysical data information indicative of geo-features generated by the information extractor. As discussed above, the integration of the inference engine with the information extraction may be performed in one of several ways, including one or both of the type of analysis performed or the output generated. At 740, hydrocarbon management is performed using one or both of the summary or the response to the questions generated at 730.

Figure 8:
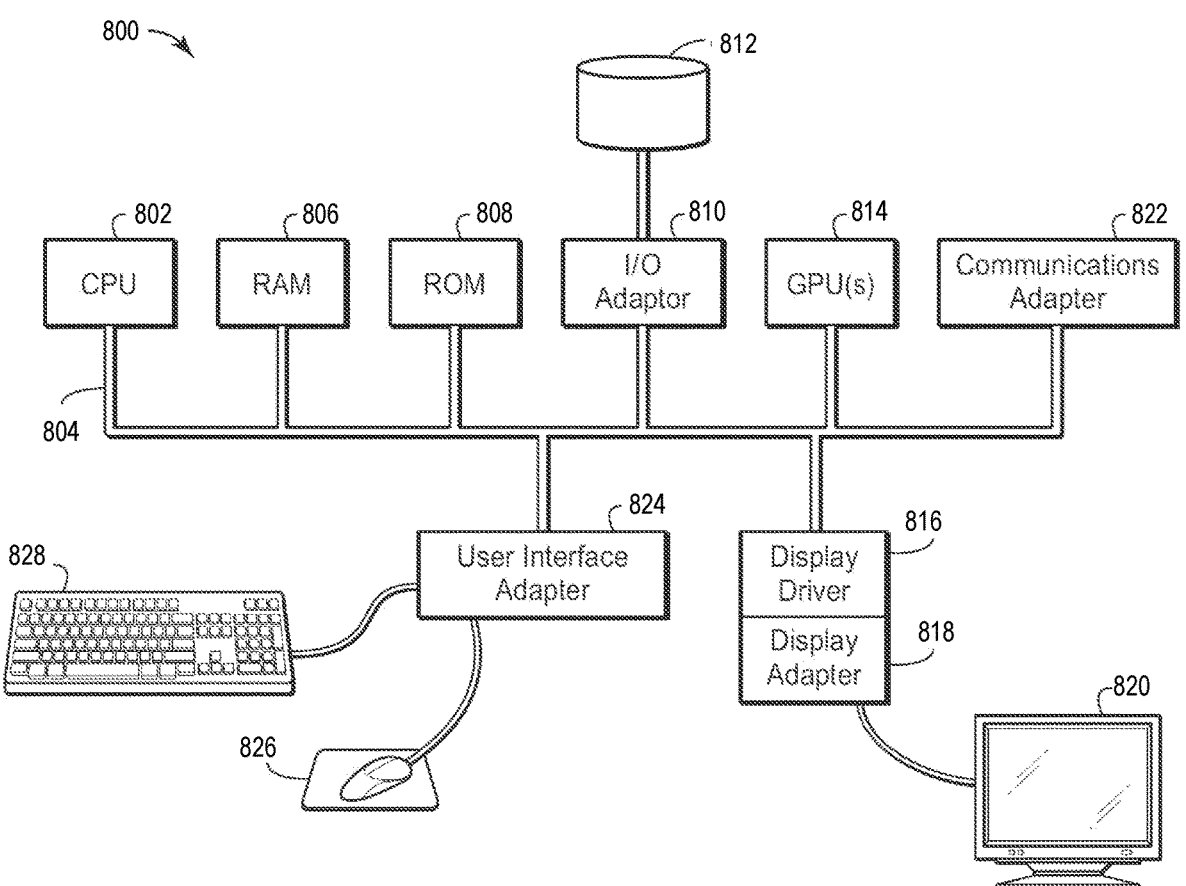
FIG. 8 is a diagram of an exemplary computer system that may be utilized to implement the methods described herein.

In all practical applications, the present technological advancement must be used in conjunction with a computer, programmed in accordance with the disclosures herein. For example, FIG. 8 is a diagram of an exemplary computer system 800 that may be utilized to implement methods described herein. A central processing unit (CPU) 802 is coupled to system bus 804. The CPU 802 may be any general-purpose CPU, although other types of architectures of CPU 802 (or other components of exemplary computer system 800) may be used as long as CPU 802 (and other components of computer system 800) supports the operations as described herein. Those of ordinary skill in the art will appreciate that, while only a single CPU 802 is shown in FIG. 8, additional CPUs may be present. Moreover, the computer system 800 may comprise a networked, multi-processor computer system that may include a hybrid parallel CPU/GPU system. The CPU 802 may execute the various logical instructions according to various teachings disclosed herein. For example, the CPU 802 may execute machine-level instructions for performing processing according to the operational flow described.

The computer system 800 may also include computer components such as non-transitory, computer-readable media. Examples of computer-readable media include computer-readable non-transitory storage media, such as a random access memory (RAM) 806, which may be SRAM, DRAM, SDRAM, or the like. The computer system 800 may also include additional non-transitory, computer-readable storage media such as a read-only memory (ROM) 808, which may be PROM, EPROM, EEPROM, or the like. RAM 806 and ROM 808 hold user and system data and programs, as is known in the art. The computer system 800 may also include an input/output (I/O) adapter 810, a graphics processing unit (GPU) 814, a communications adapter 822, a user interface adapter 824, a display driver 816, and a display adapter 818.

The I/O adapter 810 may connect additional non-transitory, computer-readable media such as storage device(s) 812, including, for example, a hard drive, a compact disc (CD) drive, a floppy disk drive, a tape drive, and the like to computer system 800. The storage device(s) may be used when RAM 806 is insufficient for the memory requirements associated with storing data for operations of the present techniques. The data storage of the computer system 800 may be used for storing information and/or other data used or generated as disclosed herein. For example, storage device(s) 812 may be used to store configuration information or additional plug-ins in accordance with the present techniques. Further, user interface adapter 824 couples user input devices, such as a keyboard 828, a pointing device 826 and/or output devices to the computer system 800. The display adapter 818 is driven by the CPU 802 to control the display on a display device 820 to, for example, present information to the user such as subsurface images generated according to methods described herein.

The architecture of computer system 800 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 800 may include various plug-ins and library files. Input data may additionally include configuration information.

Preferably, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM or other cloud computing based vendors such as Microsoft, Amazon.

The above-described techniques, and/or systems implementing such techniques, can further include hydrocarbon management based at least in part upon the above techniques, including using the one or more generated geological models in one or more aspects of hydrocarbon management. For instance, methods according to various embodiments may include managing hydrocarbons based at least in part upon the one or more generated geological models and data representations (e.g., seismic images, feature probability maps, feature objects, etc.) constructed according to the above-described methods. In particular, such methods may include drilling a well, and/or causing a well to be drilled, based at least in part upon the one or more generated geological models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well.

It is intended that the foregoing detailed description be understood as an illustration of selected forms that the invention can take and not as a definition of the invention. It is only the following claims, including all equivalents which are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

What is claimed is:

1. A computer-implemented method for analyzing geophysical data, the method comprising;

accessing the geophysical data;

performing, using an information extractor analyzing the geophysical data, information extraction in order to generate information indicative of geo-features in a subsurface, wherein the information extractor is trained in natural language and generates a description based on the geophysical data;

performing, using an inference engine analyzing the information indicative of the geo-features in the subsurface and natural language questions as input, information analysis in order to generate at least one of a summary of at least one aspect of the subsurface or a response to at least one question regarding the subsurface, wherein the inference engine is trained for natural language processing in order to generate the summary or to generate the responses to the natural language questions regarding the subsurface, wherein the summary or the response are related to one or more geological features in a subsurface indicative of containing hydrocarbons; and using the summary or the responses related to the one or more geological features in order to drill one or more wells or use the one or more wells to extract hydrocarbons from the subsurface;

wherein the information extractor and the inference engine are integrated and act in combination in order to generate the response to at least one question regarding the subsurface.

2. The method of claim 1, wherein the information analysis is performed in order to generate at least both of a summary of at least one aspect of the subsurface and the response to at least one question regarding the subsurface; and wherein the information extractor and the inference engine are integrated and act in combination in order to generate both of the summary of the at least one aspect of the subsurface and the response to at least one question regarding the subsurface.

3. The method of claim 1, wherein the information extractor includes a visual pattern recognition module that comprises a neural network including one of a convolution neural network or a U-Net; and wherein a natural language processing module comprising a recurrent neural network or one or more transformers performs natural language processing.

4. The method of claim 1, wherein using the summary or the responses to perform hydrocarbon management comprises using the summary or the responses for hydrocarbon extraction or hydrocarbon production.

5. The method of claim 2, wherein the information extractor and the inference engine act in combination with regard to natural language processing.

6. The method of claim 3, wherein the information extractor and the inference engine act in combination with regard to at least one output generated.

7. The method of claim 6, wherein the information extractor generates information indicative of a specific aspect of the subsurface; and wherein the inference engine responds to a question by outputting an image of the subsurface that highlights the specific aspect of the subsurface.

8. The method of claim 7, wherein at least one of a bounding box, a probabilistic volume, or a pseudo colored image is used in order to highlight the specific aspect of the subsurface in the image of the subsurface.

9. The method of claim 8, wherein the information extractor comprises a visual pattern recognition module that converts seismic images into geological information including at least one of: faults; salt formation; facies; stratigraphic segments; reservoir; seal; trap; or other hydrocarbon indicators.

10. The method of claim 9, wherein the information extractor comprises one or more neural networks; and wherein the inference engine comprises one or more neural networks.

11. The method of claim 10, wherein the inference engine comprises a first neural network configured to generate the summary of the at least one aspect of the subsurface and at least one additional neural network to generate the response to at least one question regarding the subsurface.

12. The method of claim 10, wherein information extraction and natural language processing are performed using one neural network.

13. The method of claim 11, wherein the inference engine generates responses to at least one of predetermined questions or natural language questions.

14. The method of claim 13, wherein the inference engine generates responses to both the predetermined questions and to the natural language questions; and wherein the inference engine includes a second neural network to generate the responses to predetermined questions and a third neural network to generate the response to the natural language questions.

15. The method of claim 12, wherein the one neural network comprises a transformer-based neural network.

16. The method of claim 15, wherein the inference engine comprises an ontology inference engine.

17. The method of claim 16, wherein the information extractor comprises a deep neural network to identify one or more geo-bodies from seismic data; and wherein the inference engine comprises a recurrent neural network that writes a natural language description of the one or more geo-bodies.

18. The method of claim 17, wherein the seismic data comprises a seismic image; and wherein the inference engine further outputs a numerical output associated with the seismic image.

19. The method of claim 18, wherein the inference engine places an overlay on the seismic image in order to highlight the one or more geo-bodies subject to the natural language description.

20. The method of claim 19, wherein the inference engine is retrained through feedback, the feedback provided in one or both of text input or voice input.

21. The method of claim 20, wherein the geophysical data comprises at least one of seismic data, gravity survey, well logs, radar, or temperature.

22. A system configured to analyze geophysical data, the system comprising:

a processor; and a non-transitory machine readable medium comprising instructions that, when executed by the processor, cause a computing system to:

access the geophysical data;

perform, using an information extractor analyzing the geophysical data, information extraction in order to generate information indicative of geo-features in a subsurface, wherein the information extractor is trained in natural language and generates a description based on the geophysical data;

perform, using an inference engine analyzing the information indicative of the geo-features in the subsurface and natural language questions as input, information analysis in order to generate at least one of a summary of at least one aspect of the subsurface or a response to at least one question regarding the subsurface, wherein the inference engine is trained for natural language processing in order to generate the summary or to generate the responses to the natural language questions regarding the subsurface, wherein the summary or the response are related to one or more geological features in a subsurface indicative of containing hydrocarbons; and use the summary or the responses related to the one or more geological features in order to drill one or more wells or use the one or more wells to extract hydrocarbons from the subsurface;

wherein the information extractor and the inference engine are integrated and act in combination in order to generate the response to at least one question regarding the subsurface.

23. A non-transitory machine-readable medium comprising instructions that, when executed by a processor, cause a computing system to:

access geophysical data;

perform, using an information extractor analyzing the geophysical data, information extraction in order to generate information indicative of geo-features in a subsurface, wherein the information extractor is trained in natural language and generates a description based on the geophysical data;

perform, using an inference engine analyzing the information indicative of the geo-features in the subsurface and natural language questions as input, information analysis in order to generate at least one of a summary of at least one aspect of the subsurface or a response to at least one question regarding the subsurface, wherein the inference engine is trained for natural language processing in order to generate the summary or to generate the responses to the natural language questions regarding the subsurface, wherein the summary or the response are related to one or more geological features in a subsurface indicative of containing hydrocarbons; and use the summary or the responses related to the one or more geological features in order to drill one or more wells or use the one or more wells to extract hydrocarbons from the subsurface;

wherein the information extractor and the inference engine are integrated and act in combination in order to generate the response to at least one question regarding the subsurface.

\* \* \* \* \*